(12) United States Patent
Hsu et al.

(10) Patent No.: US 12,508,491 B2
(45) Date of Patent: Dec. 30, 2025

(54) HAND REHABILITATION SYSTEM USING INTERACTIVE AUGMENTED REALITY

(71) Applicants: Shu-Wan Hsu, Kaohsiung (TW); Yuan-Ju Lin, Kaohsiung (TW)

(72) Inventors: Shu-Wan Hsu, Kaohsiung (TW); Yuan-Ju Lin, Kaohsiung (TW); Po-Hsuan Huang, Kaohsiung (TW); Pei-Yun Lo, Tainan (TW); Shih-Ching Wang, Kaohsiung (TW); Yi-Cheng Pan, Tainan (TW)

(73) Assignees: Shu-Wan Hsu, Kaohsiung (TW); Yuan-Ju Lin, Kaohsiung (TW)

( * ) Notice: Subject to any disclaimer, the term of this patent is extended or adjusted under 35 U.S.C. 154(b) by 884 days.

(21) Appl. No.: 17/747,896

(22) Filed: May 18, 2022

(65) Prior Publication Data
US 2023/0191230 A1    Jun. 22, 2023

(30) Foreign Application Priority Data
Dec. 16, 2021   (TW) ................... 110147192

(51) Int. Cl.
*A63B 71/06*   (2006.01)
*A63B 23/16*   (2006.01)
*G06F 3/14*    (2006.01)

(52) U.S. Cl.
CPC .......... *A63B 71/0622* (2013.01); *A63B 23/16* (2013.01); *G06F 3/14* (2013.01); *A63B 2071/0666* (2013.01); *A63B 2225/50* (2013.01)

(58) Field of Classification Search
CPC ........ A63H 3/042; G09B 1/325; G09B 19/00; G09B 19/24
See application file for complete search history.

(56) References Cited

U.S. PATENT DOCUMENTS

| | | | | |
|---|---|---|---|---|
| 7,316,567 B2 * | 1/2008 | Hsieh | ...................... | A63H 33/08 446/91 |
| 10,105,592 B2 * | 10/2018 | Brandwijk | .............. | A63F 13/00 |
| 10,229,613 B2 * | 3/2019 | Kim | ........................ | G09B 1/30 |

(Continued)

FOREIGN PATENT DOCUMENTS

| | | |
|---|---|---|
| CN | 108305529 A | 7/2018 |
| CN | 113382790 A | 9/2021 |

(Continued)

OTHER PUBLICATIONS

He et al "Development of an Evaluation System for Upper Limb Function Using AR Technology" GECCO '18 Companion, Jul. 15-19, 2018, Kyoto, Japan (Year: 2018).*

(Continued)

*Primary Examiner* — Robert J Utama
(74) *Attorney, Agent, or Firm* — MUNCY, GEISSLER, OLDS & LOWE, P.C.

(57) ABSTRACT

When an operation block is placed in a placing groove to electrically connect a connection module of the operation block to a control module that correspond in position to the placing groove, the control module sends an identification information of the operation block to a head-mounted display. The head-mounted display identifies the operation block according to the identification information thereof, and displays an augmented reality image corresponding to the operation block.

8 Claims, 5 Drawing Sheets

(56) References Cited

U.S. PATENT DOCUMENTS

2017/0031503 A1   2/2017   Rosenberg et al.
2020/0215329 A1   7/2020   Kilgard

FOREIGN PATENT DOCUMENTS

| JP | 2017-12264 A | 1/2017 |
| JP | 2018-61834 A | 4/2018 |
| JP | 2021-3379 A | 1/2021 |
| JP | 2021-58389 A | 4/2021 |
| TW | 201229923 A | 7/2012 |
| WO | 2020/039568 A1 | 2/2020 |
| WO | 2020/152779 A1 | 7/2020 |

OTHER PUBLICATIONS

Baskar, Juhi. HOLOPHAM: An Augmented Reality Training System For Upper Limb Myoelectric Prosthesis Users (Year: 2017).*
Search Report appended to an Office Action, which was issued to Taiwanese counterpart application No. 110147192 by the TIPO on Jan. 13, 2023, with an English translation thereof.

* cited by examiner

HAND REHABILITATION SYSTEM USING INTERACTIVE AUGMENTED REALITY

CROSS-REFERENCE TO RELATED APPLICATION

This application claims priority of Taiwanese Patent Application No. 110147192, filed on Dec. 16, 2021.

FIELD

The disclosure relates to a rehabilitation system, and more particularly to a hand rehabilitation system using interactive augmented reality.

BACKGROUND

FIG. 1 illustrates a conventional hand rehabilitation device 1. The hand rehabilitation device 1 includes a main body 11 having a plurality of accommodating portions 110 with different shapes, a plurality of operation blocks 12 corresponding to the shapes of the accommodating portions 110 and configured to be accommodated in the accommodating portions 110. When a user uses the hand rehabilitation device 1 to rehabilitate his/her hands, the user first selects one of the operation blocks 12, and places it into one of the accommodating portions 110 that corresponds in shape to the selected one of the operation blocks 12. By repeating the above-mentioned steps, the user can effectively improve upper limb motor function and recognition.

However, because such rehabilitation therapy only requires the user to repeatedly place and remove the operation blocks 12 into and out of the accommodating portions 110, the user may feel fatigued and bored and therefore refuse continued rehabilitation. On the other hand, multimedia technologies such as augmented reality (AR) and virtual reality (VR) may be used to gamify parts of the rehabilitation therapy to motivate the user to persist through the rehabilitation therapy.

SUMMARY

Therefore, an object of the disclosure is to provide a hand rehabilitation system using interactive augmented reality that can alleviate at least one of the drawbacks of the prior art.

According to the disclosure, the hand rehabilitation system using interactive augmented reality includes a head-mounted display, a base plate unit, and an operation unit. The base plate unit has a plate body that is formed with a plurality of placing grooves, and a plurality of control modules that are mounted to the plate body, that correspond respectively in position to the placing grooves, and that are signally connected to the head-mounted display. The operation unit has a plurality of operation blocks that are configured to be placed in the placing grooves. Each operation block having a block body, an identification module that is connected to the block body and that has an identification information identifiable by the head-mounted display, and a connection module that is electrically connected to the identification module. When each of the operation blocks is placed in one of the placing grooves of the plate body to electrically connect the connection module of the operation block to the respective one of the control modules, the respective one of the control modules sends the identification information of the identification module of the operation block to the head-mounted display, the head-mounted display identifies the operation block according to the identification information thereof, and displays an augmented reality image corresponding to the operation block. When one of the operation blocks is placed in one of the placing grooves of the plate body to electrically connect the connection module of the operation block to the respective one of the control modules, and another one of the operation blocks is stacked on the one of the operation blocks such that the connection module of the another one of the operation blocks is electrically connected to the connection module of the one of the operation blocks, the respective one of the control modules sends the identification information of the identification module of the one of the operation blocks and the identification information of the identification module of the another one of the operation blocks to the head-mounted display, the head-mounted display identifies the one and the another one of the operation blocks according to the respective identification informations thereof, and displays an augmented reality image corresponding to the one and the another one of the operation blocks.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
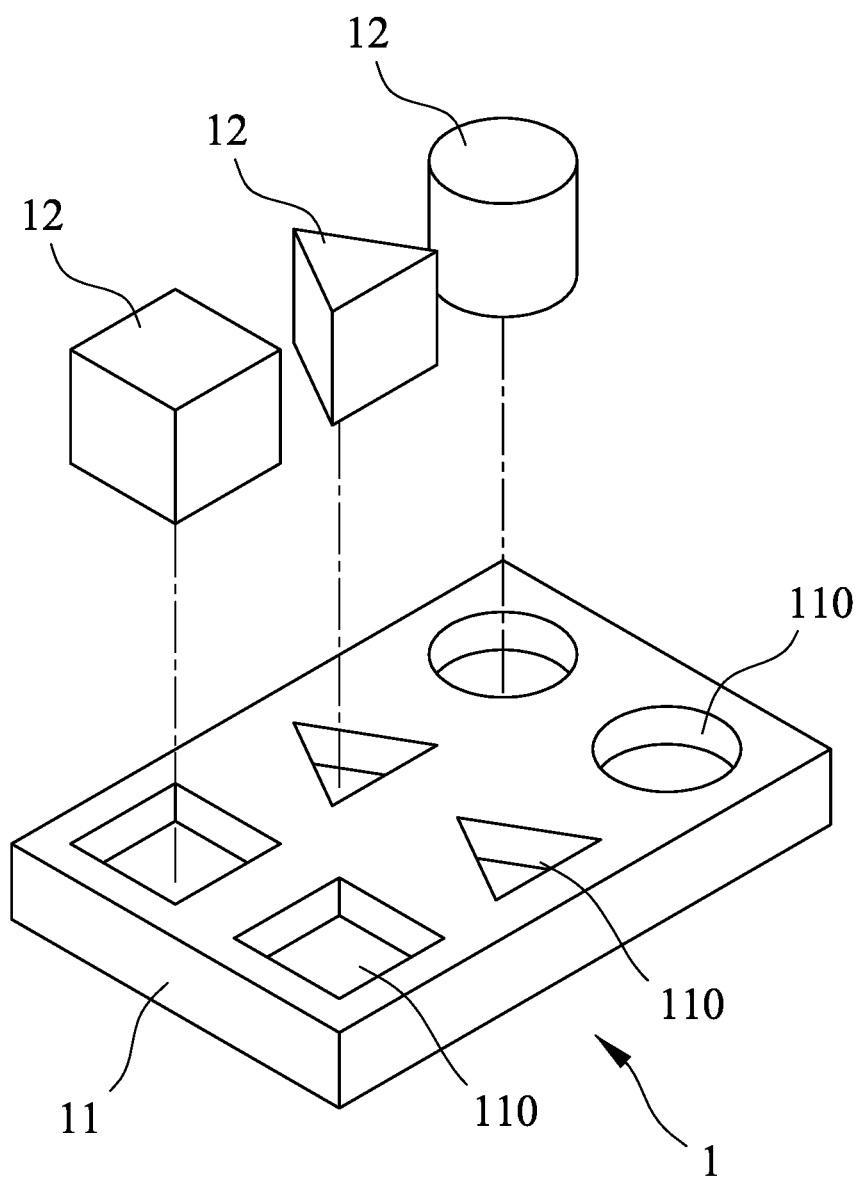
FIG. 1 is a perspective view illustrating a conventional hand rehabilitation device.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
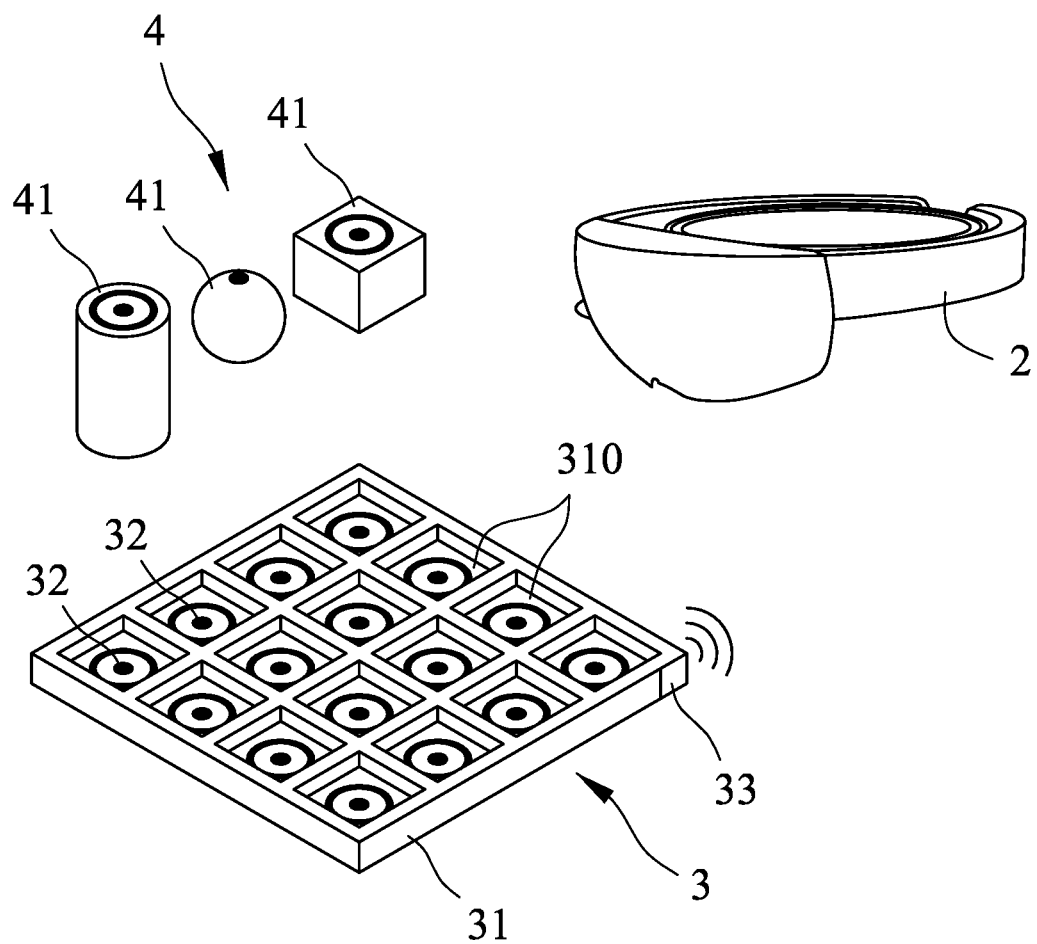
FIG. 2 is a schematic perspective view illustrating a hand rehabilitation system using interactive augmented reality according to one embodiment of the disclosure.

FIG. 2 illustrates a hand rehabilitation system using interactive augmented reality according to one embodiment of the disclosure. In this embodiment, the hand rehabilitation system includes a head-mounted display 2 that can be mounted on the head of a user, a base plate unit 3 that is signally connected to the head-mounted display 2, and an operation unit 4 that is operable by the user to do rehabilitation.

In this embodiment, the head-mounted display 2 may be Microsoft HoloLens®, but other equivalent devices may be used as long as the head-mounted display 2 can receive signals and display augmented reality images.

The base plate unit 3 includes a plate body 31 that is formed with a plurality of placing grooves 310, a plurality of control modules 32 that are mounted to the plate body 31 and that are disposed in the placing grooves 310 respectively, and a wireless communication module 33 that is electrically connected to the control modules 32 and that is signally connected to the head-mounted display 2.

It is preferable that the plate body 31 is made of a plastic material that is easy to mold or a wood material that is easy to process, so as to facilitate forming of the placing grooves 310 that may have various forms. There is no particular limitation about the control modules 32, as long as the control modules 32 can send information about the operation unit 4 to the head-mounted display 2 through the wireless communication module 33. The wireless communication module 33 is signally connected to the head-mounted display 2 via wireless communication between the wireless communication module 33 and the head-mounted display 2 so as to be capable of sending the information about the operation unit 4 to the head-mounted display 2. The wireless communication between the wireless communication module 33 and the head-mounted display 2 may be implemented by Wi-Fi communication and/or Bluetooth® communication. Therefore, when using the hand rehabilitation system of the disclosure, the user can have a better user experience without the restriction of cables.

In this embodiment, in order to calibrate the relative position between the displayed image in the head-mounted display 2 and the plate body 31 for accurate positioning, the base plate unit 3 is provided with a two-dimensional code which is readable by the head-mounted display 2 for performing an initial positioning, such that the head-mounted display 2 can recognize the spatial position of the base plate unit 3 with certainty.

Figure 3:
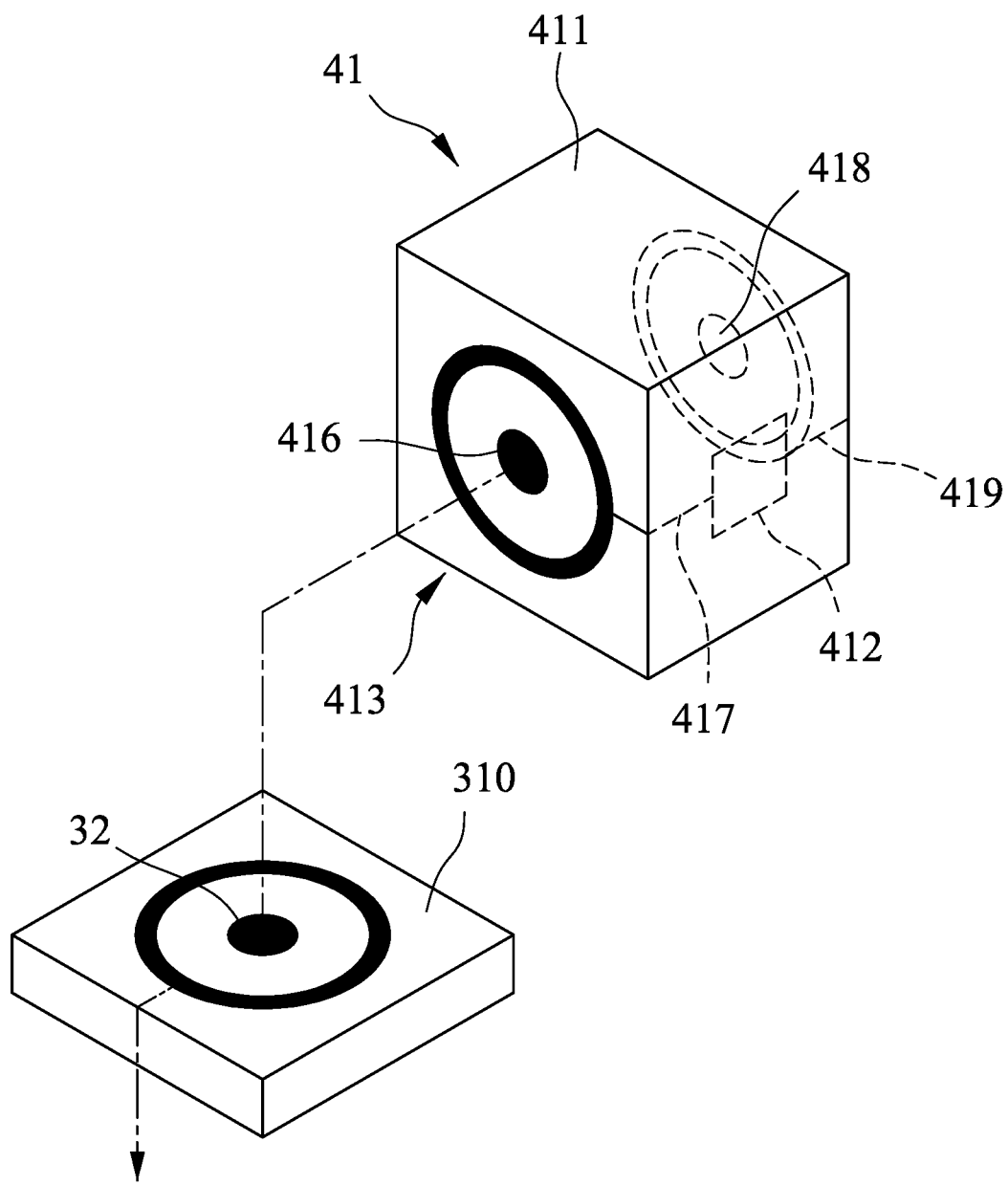
FIG. 3 is a schematic perspective view illustrating a situation in which an operation block is electrically connected to a control module according to the embodiment of the disclosure.

Further referring to FIG. 3, the operation unit 4 includes a plurality of operation blocks 41 that are configured to be placed in the placing grooves 310. Each operation block 41 has a block body 411, an identification module 412 that is connected to the block body 411 and that has an identification information identifiable by the head-mounted display 2, and a connection module 413 that is electrically connected to the identification module 412. In this embodiment, the operation blocks 41 have different shapes, and the identification information of the identification modules 412 of the operation blocks 41 differs according to the shapes of the operation blocks 41. In other embodiments, the operation blocks 41 may have different colors, and the identification information differs according to the colors of the operation blocks 41. In this embodiment, the identification modules 412 of the operation blocks 41 are ID (identifier) chips As shown in FIG. 3, the connection module 413 of each of the operation blocks 41 has two terminals 416, 418, each being configured to be connected to one of the control modules 32 or one of the terminals 416, 418 of the connection module 413 of another one of the operation blocks 41, and two electronic circuits 417, 419 respectively and electrically connected to the terminals 416, 418 and electrically connected to the identification module 412. In this embodiment, the identification module 412 and the electronic circuits 417, 419 of the connection module 413 are embedded in the block body 411 in order not to affect the design of the block body 411 and to prevent wear thereof.

Figure 4:
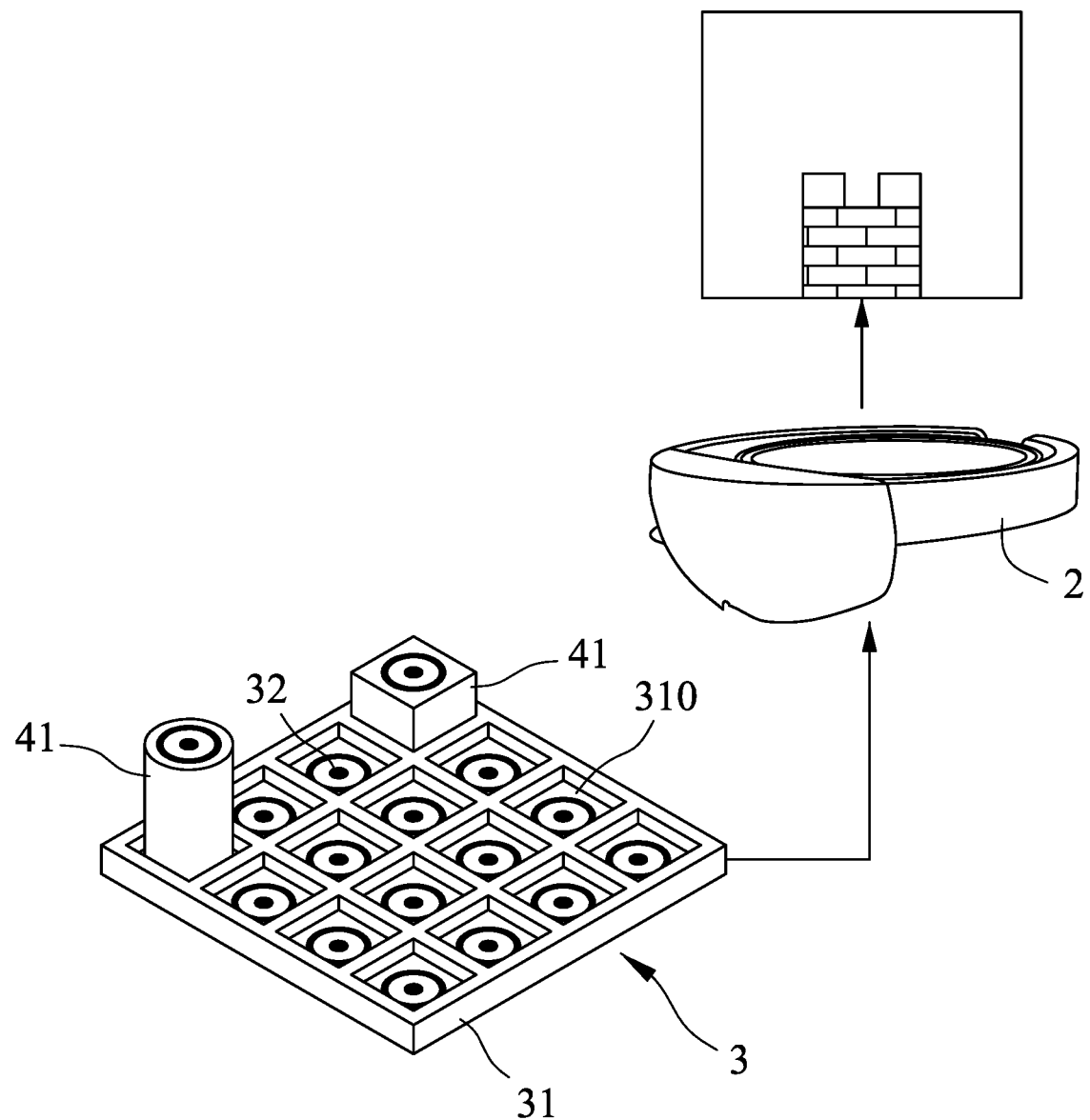
FIG. 4 is a schematic perspective view illustrating a situation in which operation blocks are placed in placing grooves of a plate body according to the embodiment of the disclosure.

Referring to FIG. 4 along with FIG. 2 and FIG. 3, when each of the operation blocks 41 is placed in one of the placing grooves 310 to electrically connect the connection module 413 of the operation block 41 to the respective one of the control modules 32, the respective one of the control modules 32 obtains the identification information of the identification module 412 of the operation block 41 through the connection module 413 of the operation block 41 and sends the identification information to the head-mounted display 2 through the wireless communication module 33. After, receiving the identification information, the head-mounted display 2 identifies the operation block 41 according to the identification information thereof and displays the augmented reality image corresponding to the operation block 41. In particular, when the operation block 41 is placed in the placing grooves 310, one of the terminals 416, 418 (shown as the terminal 416 in FIG. 3) of the operation block 41 is connected to the control module 32 so as to electrically connect the connection module 413 of the operation block 41 to the control module 32.

It should be noted that in addition to sending the identification information of the operation block 41, the respective one of the control modules 32 may also sends a position information of the placing groove 310 to the head-mounted display 2 at the same time. As a result, if relationships between the augmented reality images and the operation blocks 41 are preset in the head-mounted display 2, the head-mounted display 2 can display the augmented reality image of the operation block 41 according to the received identification information thereof at a place on a screen of the head-mounted display 2 according to the position information of the placing groove 310.

For example, the augmented reality images corresponding to the operation blocks 41 with different shapes may be set in advance with a theme of castle. In such an example, when a cube-shaped operation block 41 is placed in one of the placing grooves 310 of the plate body 31 to electrically connect the connection module 413 of the cube-shaped operation block 41 to the respective one of the control modules 32, the head-mounted display 2 receives the identification information of the cube-shaped operation block 41 and the position information of the one of the placing groove 310, and displays, for example, an augmented reality image of a castle wall, which is associated with the cube-shaped operation block 41 in advance, at a place on the screen of the head-mounted display 2 according to the position information.

It should be noted that the above-stated theme of the augmented reality images is merely an example, and there is no particular limitation on the theme of the augmented reality images. The theme of the augmented reality images can be set according to the shape of the base-plate unit 3, operating environment, user preference, etc. For example, a garden theme may be selected. Furthermore, the augmented reality images may have multiple themes such that the user can choose the theme of the augmented reality images according to the mood of the moment such that the same hand rehabilitation system can be played in different ways to increase its replayability, thereby preventing the user from losing motivation in rehabilitation.

Figure 5:
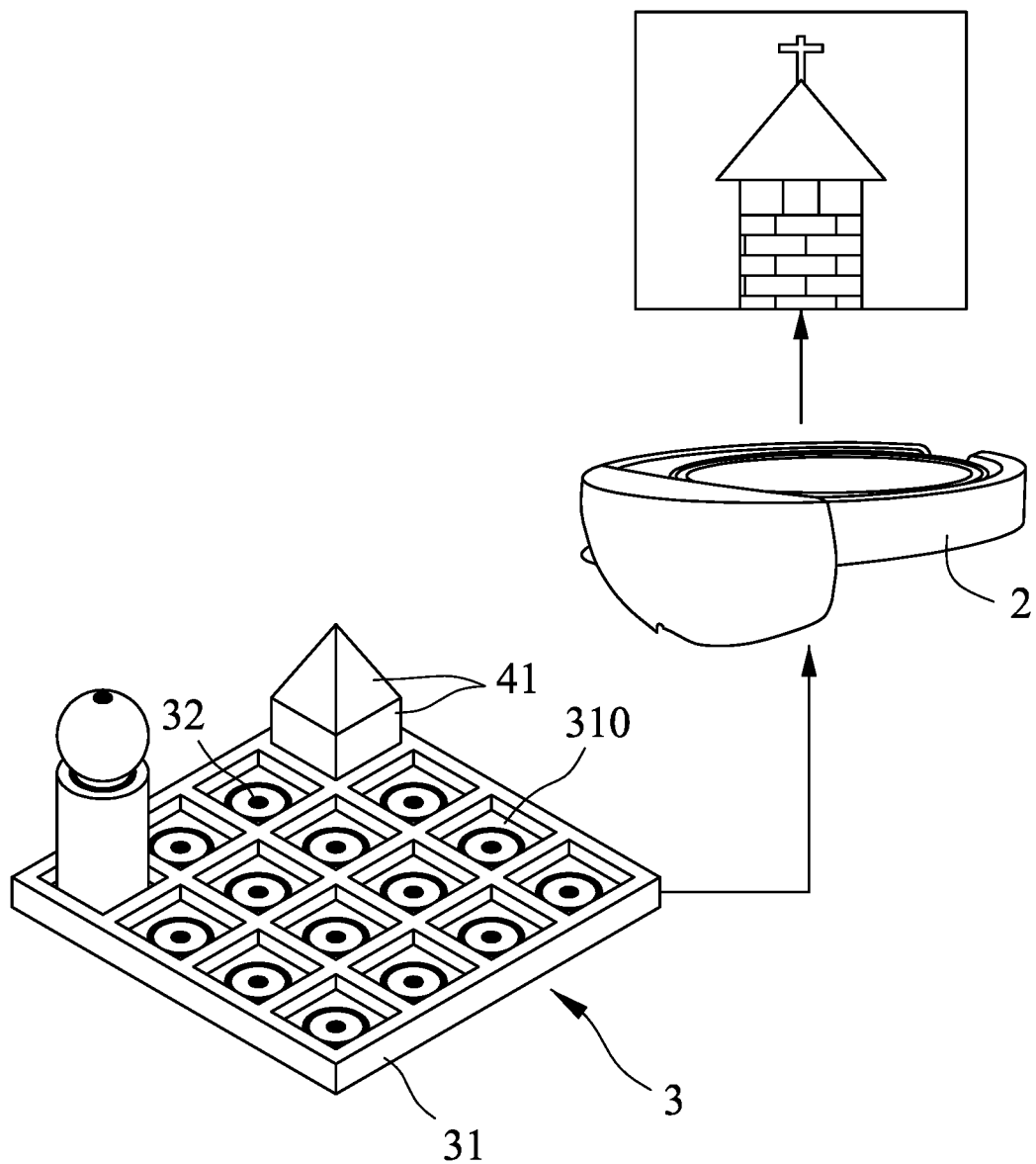
FIG. 5 is a schematic perspective view illustrating a situation in which the operation blocks are placed in the placing grooves of the plate body and other operation blocks are stacked on the operation blocks according to the embodiment of the disclosure.

Referring to FIG. 5 along with FIG. 2 and FIG. 3, when one of the operation blocks 41 is placed in one of the placing grooves 310 of the plate body 31 to electrically connect the connection module 413 of the operation block 41 to the respective one of the control modules 32, and another one of the operation blocks 41 is stacked on the one of the operation blocks 41 such that the connection module 413 of the another one of the operation blocks 41 is electrically connected to the connection module 413 of the one of the operation blocks 41, the respective one of the control modules 32 obtains the identification information of the identification module 412 of the one of the operation blocks 41 through the connection module 413 of the one of the operation blocks 41, obtains the identification information of the information module 412 of the another one of the operation blocks 41 through the one of the operation blocks 41 and the connection module 413 of the another one of the operation blocks 41, and sends identification information of the one of the operation blocks 41 and the another one of the operation blocks 41 to the head-mounted display 2 through the wireless communication module 33. Receiving the identification information, the head-mounted display 2 identifies the one and the another one of the operation blocks 41 according to the respective identification informations thereof, and displays the augmented reality image corresponding to the one and the another one of the operation blocks 41. In particular, when one of the operation blocks 41 is placed in the placing grooves 310 and another one of the operation blocks 41 is stacked on the one of the operation blocks 41, one of the terminals 416, 418 (shown as the terminal 416 in FIG. 3) of the one of the operation blocks 41 is connected to the control module 32, and one of the terminals 416, 418 of the another one of the operation blocks 41 is connected to another one of the terminals 416, 418 (shown as the terminal 418 in FIG. 3) of the one of the operation blocks 41, so as to electrically connect the connection module 413 of the one of the operation blocks 41 to the control module 32, and so as to electrically connect the connection module 413 of the one of the operation blocks 41 to the connection module 413 of the another one of the operation blocks 41.

As shown in FIG. 5, in the example in which the augmented reality images of the operation blocks 41 with different shapes are set in advance with the theme of the castle, when the user stacks a pyramid-shaped operation block 41 on a cube-shaped operation block 41 that is placed in one of the placing grooves 310 and the connection module 413 of the cube-shaped operation block 41 is electrically connected to a respective one of the control modules 32 such that the connection module 413 of the pyramid-shaped operation block 41 is electrically connected to the connection module 413 of the cube-shaped operation block 41, the head-mounted display 2 further displays, for example, an augmented reality image of a roof of a castle, which is associated with the pyramid-shaped operation block 41 in advance, on top of the displayed augmented reality image of a castle wall, which is associated with the cube-shaped operation block 41 in advance, such that a combination of the augmented reality images become a castle tower. In this way, the user can be immersed in building their own castle without being conscious of recovering the motor function of their hands when using the operation blocks 41 to do rehabilitation. The hand rehabilitation system according to the disclosure thus transforms the conventionally boring and monotonous rehabilitation therapy to become more interesting to the user, thereby increasing the user's motivation to persist through rehabilitation therapy. It should be noted that the augmented reality images shown in FIG. 4 and FIG. 5 is merely an example.

It should be further noted that, in this embodiment, the respective one of the control modules 32 sends the identification information that corresponds to all of the operation blocks 41 placed in the placing groove 310 together to the head-mounted display 2. Take the above-mentioned case for example, the respective one of the control modules 32 first sends the identification information of the cube-shaped operation block 41, and when the pyramid-shaped operation block 41 is stacked on the cube-shaped operation block 41, the respective one of the control module 32 sends the identification information of the cube-shaped operation block 41 and the identification information of the pyramid-shaped operation block 41 together. Therefore, the hand rehabilitation system of the disclosure is not only applicable to the above-stated case in which two operation blocks 41 are stacked on one another, but also applicable to a case where three or more operation blocks 41 are stacked on one another at the placing grooves 310.

In this embodiment, the hand rehabilitation system is configured to identify the operation blocks 41 according to the identification information thereof rather than an image. Accordingly, even when the operation blocks 41 are stacked on one another in one of the placing grooves 310 so that other operation blocks 41 placed in another one of the placing grooves 310 are hidden by the stacked operation blocks 41, the head-mounted display 2 can still identify every one of the operation blocks 41 placed in the placing grooves 310 or stacked on one another, thereby providing a better user experience, and facilitating arrangement of rehabilitation by therapists.

To sum up, according to the hand rehabilitation system using interactive augmented reality of the disclosure, the head-mounted display 2 displays augmented reality images that correspond to the operation blocks 41 placed in the placing grooves 310. Such arrangement can gamify the rehabilitation processes so as to increase the motivation of the user for doing rehabilitation. Furthermore, since the head-mounted display 2 can identify the operation blocks 41 according to the received identification information, better user experience can be provided compared to an arrangement where the operation blocks 41 are configured to be identified according to their appearances.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A hand rehabilitation system using interactive augmented reality, comprising:
   a head-mounted display;
   a base plate unit having
      a plate body that is formed with a plurality of placing grooves, and
      a plurality of control modules that are mounted to said plate body, that correspond respectively in position to said placing grooves, and that are signally connected to said head-mounted display; and
an operation unit having a plurality of operation blocks that are configured to be placed in said placing grooves, each of said operation blocks having a block body, an identification module that is connected to said block body and that has an identification information identifiable by said head-mounted display, and a connection module that is electrically connected to said identification module;
wherein, when each of said operation blocks is placed in one of said placing grooves of said plate body to electrically connect said connection module of said operation block to the respective one of said control modules, said respective one of said control modules sends the identification information of said identification module of said operation block to said head-mounted display, and said head-mounted display identifies said operation block according to the identification information thereof, and displays an augmented reality image corresponding to said operation block;
wherein, when one of said operation blocks is placed in one of said placing grooves of said plate body to electrically connect said connection module of said operation block to the respective one of said control modules, and another one of said operation blocks is stacked on said one of said operation blocks such that said connection module of said another one of said operation blocks is electrically connected to said connection module of said one of said operation blocks, said respective one of said control modules sends the identification information of said identification module of said one of said operation blocks and the identification information of said identification module of said another one of said operation blocks to said head-mounted display, and said head-mounted display identifies said one and said another one of said operation blocks according to the respective identification information thereof, and displays an augmented reality image corresponding to said one and said another one of said operation blocks; and wherein said operation blocks have different shapes, and said identification information of said identification modules of said operation blocks correspond to the shapes of said operation blocks respectively.

2. The hand rehabilitation system as claimed in claim 1, wherein said control modules of said base plate unit are disposed respectively in said placing grooves of said plate body.

3. The hand rehabilitation system as claimed in claim 1, wherein said connection module of each of said operation blocks has:
two terminals, each being configured to be connected to one of said control modules or one of said terminals of said connection module of another one of said operation blocks; and
two electronic circuits respectively and electrically connected to said terminals and electrically connected to said identification module.

4. The hand rehabilitation system as claimed in claim 3, wherein, for each of said operation blocks, said two electronic circuits of said connection module are embedded in said block body.

5. The hand rehabilitation system as claimed in claim 1, wherein, for each of said operation blocks, said identification module is embedded in said block body.

6. The hand rehabilitation system as claimed in claim 1, wherein said identification module of each of said operation blocks is an identifier chip.

7. The hand rehabilitation system as claimed in claim 1, wherein said base plate unit further has a wireless communication module electrically connected to said control modules and signally connected to said head-mounted display such that the identification information of said identification modules of said operation blocks are sent to said head-mounted display via wireless communication between said wireless communication module and said head-mounted display.

8. The hand rehabilitation system as claimed in claim 7, wherein the wireless communication between said wireless communication module and said head-mounted display is selected from a group consisting of Wi-Fi communication and Bluetooth communication.

* * * * *